United States Patent
Kuster et al.

(10) Patent No.: US 10,883,580 B2
(45) Date of Patent: Jan. 5, 2021

(54) BALL SCREW DRIVE

(71) Applicant: SFS intec Holding AG, Heerbrugg (CH)

(72) Inventors: Hanspeter Kuster, Balgach (CH); Marijo Zach, Widnau (CH); Andreas Kalb, Schwarzach (AT); Stefan Frei, Widnau (CH); Pascal Hutter, Diepoldsau (CH)

(73) Assignee: SFS intec Holding AG, Heerbrugg (CH)

( * ) Notice: Subject to any disclaimer, the term of this patent is extended or adjusted under 35 U.S.C. 154(b) by 313 days.

(21) Appl. No.: 15/787,025

(22) Filed: Oct. 18, 2017

(65) Prior Publication Data

US 2018/0112751 A1   Apr. 26, 2018

(30) Foreign Application Priority Data

Oct. 24, 2016   (DE) .......................... 10 2016 120 248

(51) Int. Cl.
| | |
|---|---|
| *F16H 25/22* | (2006.01) |
| *F16H 25/24* | (2006.01) |
| *F16H 25/20* | (2006.01) |
| *F16H 25/08* | (2006.01) |

(52) U.S. Cl.
CPC ......... *F16H 25/2204* (2013.01); *F16H 25/08* (2013.01); *F16H 25/24* (2013.01); *F16H 2025/2031* (2013.01); *F16H 2025/2037* (2013.01); *F16H 2025/2481* (2013.01)

(58) Field of Classification Search
CPC ......... F16H 25/2204; F16H 2025/2481; F16H 2025/2037
See application file for complete search history.

(56) References Cited

U.S. PATENT DOCUMENTS

| | | | | |
|---|---|---|---|---|
| 2005/0172487 | A1* | 8/2005 | Kamiya | ................... B23H 5/08 29/898.066 |
| 2006/0207361 | A1* | 9/2006 | Kazuno | ............... F16H 25/2223 74/89.44 |
| 2014/0290409 | A1* | 10/2014 | Rehfus | ................ F16H 25/2204 74/424.81 |
| 2015/0240923 | A1 | 8/2015 | Baukholt et al. | |
| 2015/0323050 | A1* | 11/2015 | Ohno | ...................... F16H 25/20 74/434 |

FOREIGN PATENT DOCUMENTS

| | | |
|---|---|---|
| DE | 10056275 | 5/2002 |
| DE | 20108885 | 10/2002 |
| DE | 102007026605 | 12/2008 |
| DE | 102013217161 | 3/2014 |

\* cited by examiner

*Primary Examiner* — Terence Boes
(74) *Attorney, Agent, or Firm* — Volpe Koenig

(57) ABSTRACT

A ball screw having a spindle nut (21), a threaded spindle, and a retaining element (23) is provided. The retaining element (23) is connected in a form-fitting, play-free manner to the threaded nut (21) by a projection (24) which fits around the outside of the threaded nut (21) in an end region. The threaded nut (21) and the retaining element (23) functioning as a force transmission member are first positioned precisely during manufacture and then connected by a form-fitting, in particular play-free connection, in particular by caulking, crimping, clinching or other deformation processes.

4 Claims, 3 Drawing Sheets

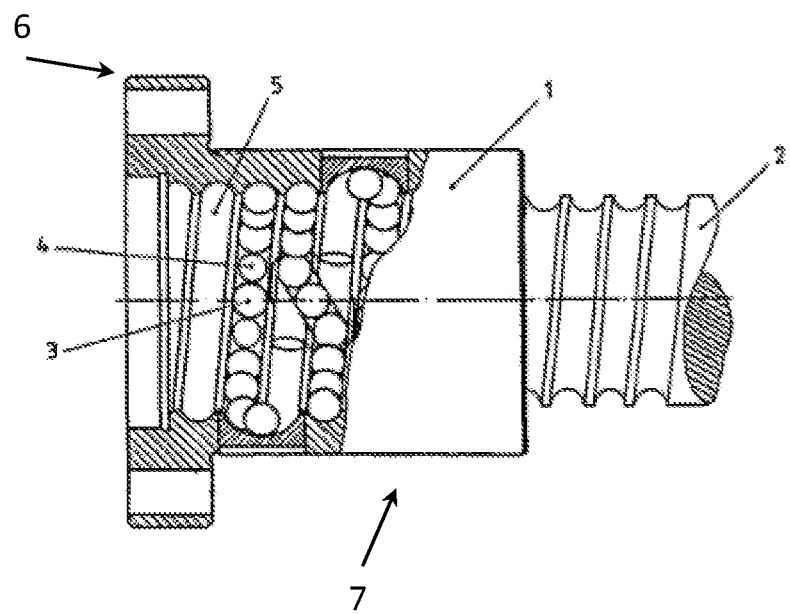
Figure 1: Prior Art
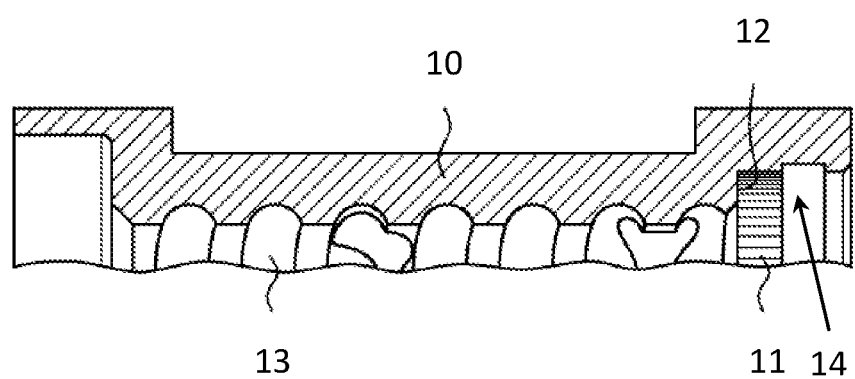
Figure 2: Prior Art

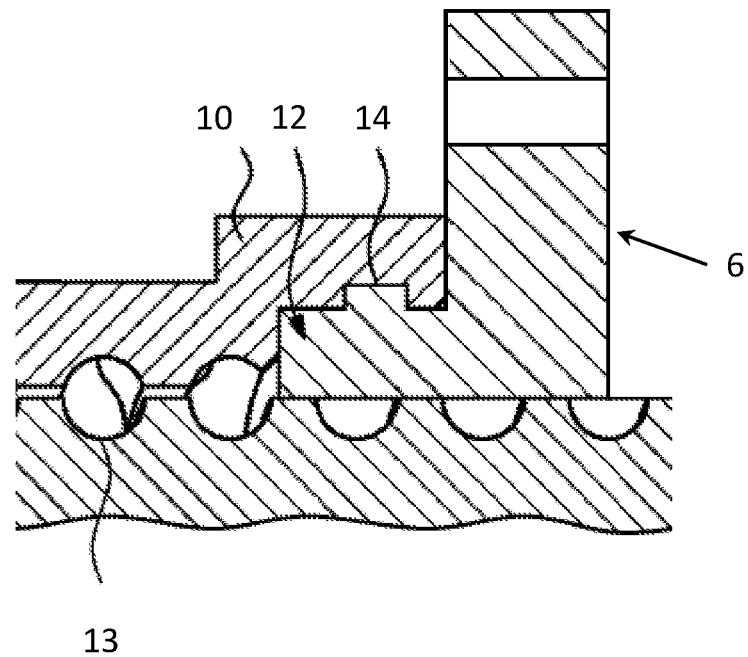
Figure 3: Prior Art
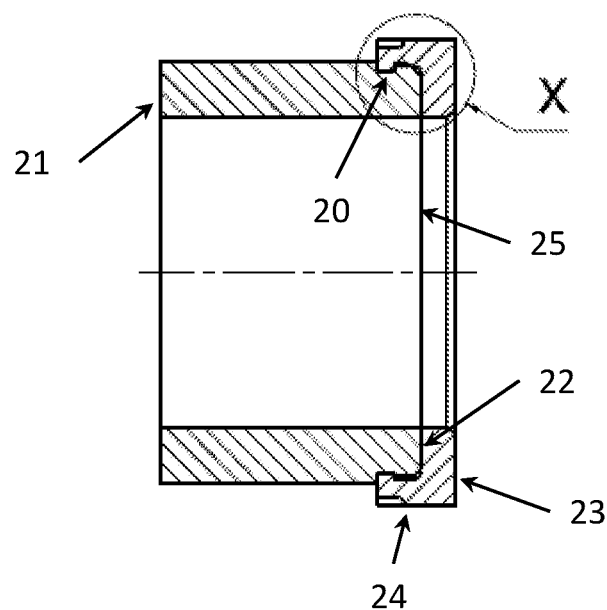
Figure 4

BALL SCREW DRIVE

INCORPORATION BY REFERENCE

The following documents are incorporated herein by reference as if fully set forth: German Patent Application No. 102016120248.7, filed Oct. 24, 2016.

BACKGROUND

A ball screw drive or ball screw is an assembly of a screw drive with balls as the rolling elements. It is used to convert a rotary movement into a longitudinal movement and therefore is also considered a type of linear drive. The present invention addresses improvements to the production of said drives, in particular with an improvement in the fastening elements on ball screws.

PRIOR ART

FIG. 1 shows the main parts of a ball screw 7, including a threaded spindle 2 and a spindle nut (ball circulation nut) 1 fitting around said spindle. The spindle nut 1 consists of a nut body with incorporated ball races 5, which are formed to match the geometry of the threaded spindle 2, a ball return channel, and what are known as return tubes. The nut body has space for several load-bearing ball races, that is, inner threads which together with the outer thread of the spindle form the space for accommodating the load-bearing balls 3, 4. With the ball return (often also referred to as ball recirculation), the balls are lifted completely off the spindle at the end of the thread by inserts in the nut and directed back through a return tube, for example.

The nut body is generally provided with a flange 6 to be able to apply the torque. As shown in the prior art of FIG. 1, it is possible to form said nut as a single piece to optimise the transmission of force and the possibility for fastening. However, the production of the nut is made complex as a result, because, in addition to the ball races (inner thread) and the post-machining thereof, and the cut-outs for the ball returns, the possibilities for fastening must also be provided. Therefore, many turning, milling and drilling steps are necessary.

It is known to be advantageous to manufacture said flange and the nut in separate production processes and to join them together in a form- and/or force-fitting manner. DE 10 2013 217 161 A1 describes a form-fitting connection between a threaded nut and the flange, referred to in said document as a force transmission member. The connection between the threaded nut and the flange is preferably play-free and thus allows a particularly precise process of a brake piston connected to the force transmission member. The form-fitting connection between the threaded nut and the force transmission member is preferably made by clinching or caulking. To this end, the threaded nut according to DE 10 2013 217 161 A1 (cf. FIG. 2) preferably has a sleeve-like design at one end with a stop region 12 and a radially peripheral groove 14 forming an undercut. When the flange part 6 is pressed into the threaded nut 10 during the joining process, the material of the flange in the stop region 12 is deformed and fills the peripheral groove 14. If knurling 11 is provided in the stop region 14, the rotation resistance in the final state is also improved. FIG. 3 shows the joined state by way of example.

DISADVANTAGES OF THE PRIOR ART

It has been found in practice that the crimping process often cannot be carried out in as dimensionally stable a manner as desired. The reason for this is that the base material for the flange 6 is introduced into the sleeve-like end of the threaded nut 10 and the pressing process begins with the upsetting of the material in the stop region 12. In the process, material which lies directly in the region of the stop region 12, which is essential for the fit accuracy of the join, is reshaped to secure the join. The necessary parallel state between the flange 6 and the plane marked by the stop region 12 is therefore no longer ensured. However, the stop region is critical for the dimensional stability of the join, in particular the axial alignment of the spindle nut 10 with the flange 6.

SUMMARY

The object of the present invention is to avoid the disadvantages of the prior art, in particular to provide a device and a method for the secure and dimensionally stable connection of a flange and a threaded nut of a ball screw.

This is achieved using one or more features of the invention. Advantageous embodiments are described below and in the claims.

According to the invention and in contrast with the prior art, it is provided that the form- and force-fitting connection be achieved by a different arrangement and procedure in the joining process. In simpler terms, in the above-described prior art, the positioning of the flange or force transmission member relative to the threaded nut is achieved by or at the end of the crimping or caulking process. However, the present invention provides that the caulking/crimping/clinching take place only after precise positioning.

This is achieved in that one or more joining regions 20 are no longer arranged directly adjacent to and/or in the inner region of the threaded nut 21 but on the outer circumference thereof. During the joining process according to the present invention, a retaining element 23, which can be a flange or a tubular extension, is pushed onto the spindle nut 21 first. To this end, the retaining element 23 has one or more projecting regions 24, which, as seen from the retaining element 23, fit over an end of the spindle nut 21 and project beyond the positioning plane 25 into the region of the nut body. The projection 24 can be formed of individual tongue-like elements or else of a fully annular projection, similar to a bushing. The clear opening of the projection 24 can correspond to the outer diameter of the spindle nut 21 or be slightly over- or undersized.

The retaining element 23 is pushed onto the spindle nut 21 until a precise fit of the retaining element 23 on the spindle nut body in the stop region 22 or in the positioning plane 25 has been achieved. A form fit and a force fit between the retaining element 23 and the spindle nut 21 is then achieved by external application of force onto the projection 24. This application of force can be implemented as caulking or clinching. The force can be applied to the entire length of contact between the retaining element 23 and the spindle nut 21 or else only in some sections, as indicated in FIG. 6. The joining is preferably effected solely by this application of force, but welds, adhesive bonds, seals can be used in addition, depending on the use profile.

FIG. 5 shows a detail taken from FIG. 4 in the joined region, by way of example. In this case, in a development of the invention, different measures which can reinforce the connection between the spindle nut 21 and the retaining element 23 have been taken on the outer circumference of the spindle nut 21. A peripheral groove 26 in the outer circumference of the spindle nut 21 or in the joining region 20 creates space for the crimped or caulked material and thus acts as a filling region 26. Feature 27 describes the region of the retaining element 23 which is deformed by the application of force. In the filling region 26, a roughened portion, knurling or other surface treatment or coating can be provided to support the join after crimping/caulking.

The retaining element 23 can be in the form of a flange, similar to that indicated in FIG. 1, and have corresponding bores for screw-fastenings. Alternatively, the retaining element can have any shape which provides the desired function in design terms. The retaining function can be achieved by clamping, screw-fastening, pin-fastening, welding, adhesive bonding etc. or by means of an integrated bolt for torque transmission. FIG. 6 shows a design of the retaining element 23 as a hexagon. The recesses 27 have been achieved by the application of force while the threaded nut 21 is joined to said retaining element 23.

BRIEF DESCRIPTION OF THE DRAWINGS

FIG. 1 shows a ball screw according to the prior art;
FIG. 2 shows a section through a spindle nut according to the prior art;
FIG. 3 shows a flange detail from FIG. 2;
FIG. 4 shows an embodiment of the invention.

DETAILED DESCRIPTION OF THE PREFERRED EMBODIMENTS

Figure 5:
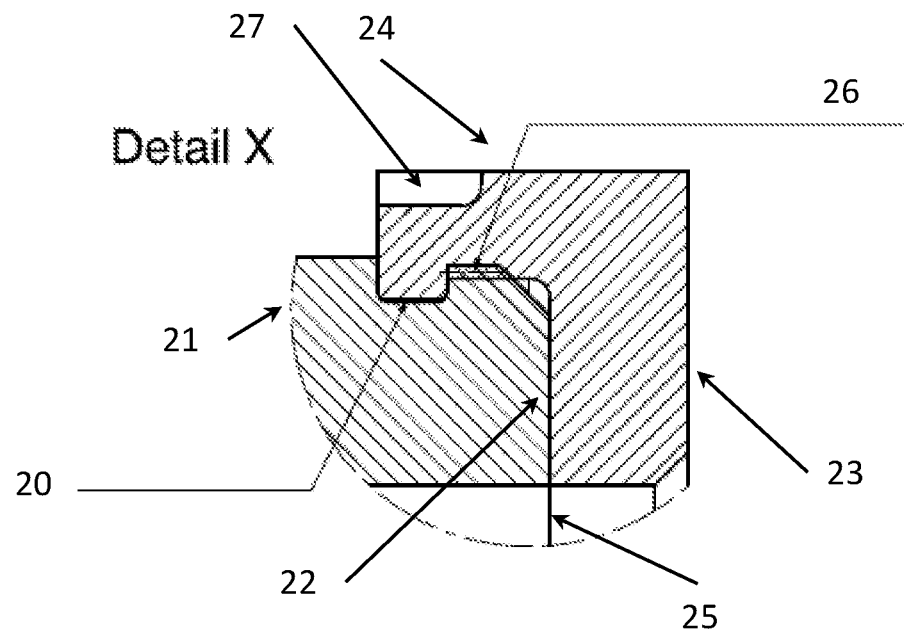
FIG. 5 shows a detail X from FIG. 4.

The invention is explained in more detail by the attached drawings. FIG. 1 shows, as the prior art, a ball screw 7 with a threaded spindle 2 and a spindle nut (ball circulation nut) 1 fitting around said spindle. The nut body has incorporated ball races 5, which are designed to match the geometry of the threaded spindle 2. The nut body has a plurality of load-bearing ball races 5, that is, inner threads which together with the outer thread of the spindle form the space for accommodating the load-bearing balls 3, 4. With the ball return (often also referred to as ball recirculation), the balls are lifted completely off the spindle at the end of the thread by inserts in the nut and directed back through a return tube, for example. A flange 6 acts as a torque transmission means.

FIG. 2 shows a sleeve-like threaded nut 10 in an alternative design (still) without torque support. The sectional drawing shows a sleeve-like formation at one end of the spindle nut with a stop region 12 and a radially peripheral groove 14 forming an undercut. Feature 13 is a ball channel.

FIG. 3 shows the spindle nut 10 of FIG. 2 with a crimped flange 6. During the joining process, the material of the flange in the stop region 12 is deformed and fills the peripheral groove 14 at least partially on the circumference. The flange 6 and the threaded nut 10 thus form a joined unit; this crimping process has a negative effect on the dimensional stability of the overall connection. If knurling 11 is provided in the stop region 14, the torque transmission in the final state is also improved.

FIG. 4 and FIG. 5 in detail show a joined connection of a flange element or retaining element 23 with a spindle nut 21 according to the invention. During production, the retaining element 23 is pushed onto the spindle nut 21. As soon as a precise fit has been achieved in the stop region 22 or the positioning plane 25, the projection 24 is crimped onto the spindle nut 21. In this case, only material from the projection 24 or in the edge region of the nut body is affected; there is no reshaping in the region of the stop region 22 responsible for the fit accuracy. The joining region 20 faces away from the fit 22, therefore the reshaping has no effect.

Figure 6:
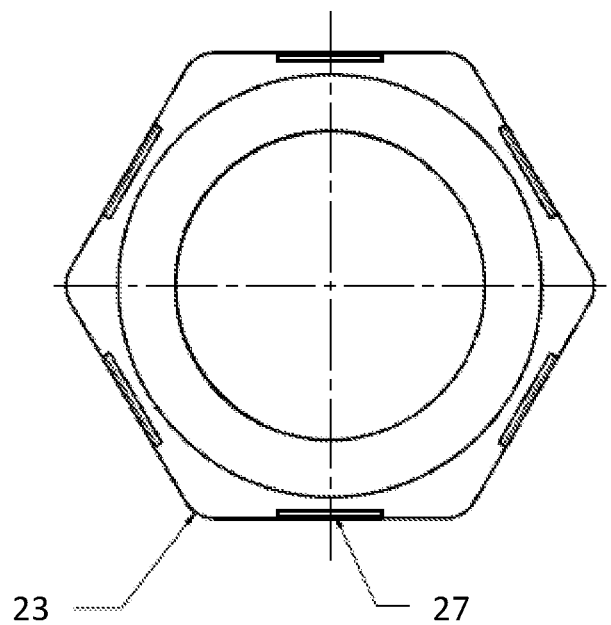
FIG. 6 shows an axial plan view of a flange according to the invention.

FIG. 6 shows a retaining element 23/flange in plan view in the assembled state with recesses 27, in this case press marks.

LIST OF REFERENCE SYMBOLS

1 Spindle nut
2 Threaded spindle
3 Ball
4 Ball
5 Ball races
6 Flange
7 Ball screw
10 Spindle nut, alternative design
11 Knurling
12 Stop region
13 Channel
14 Inner, radially peripheral groove
20 Joining region
21 Spindle nut
22 Stop region
23 Retaining element, flange
24 Projection
25 Positioning plane
26 Filling region
27 Recess

The invention claimed is:

1. A method for producing a ball screw which has a threaded spindle, a threaded nut, and a retaining element, the method comprising:
first positioning the threaded nut and the retaining element which functions as a force transmission member together precisely during manufacture without deformation of the threaded nut or the retaining element by axially pushing the retaining element into a defined fit position on the spindle nut body against a stop region in which an axial end of the threaded nut contacts a surface of the retaining element and a projecting region of the retaining element that fits over the end of the threaded nut extends axially beyond the stop region, and
then connecting said retaining element by a form-fitting connection via a radial application of force at least in some sections of the projecting region axially spaced from the stop region to at least one of caulk, crimp, clinch, or deform material of the projecting region onto the threaded nut without affecting a position of the stop region.

2. The method according to claim 1, wherein, during production of the form-fitting connection between the threaded nut and the retaining element, material of the retaining element is pressed into a filling region on the threaded nut.

3. The method according to claim 1, wherein the form-fitting connection of the retaining element to the spindle nut is supported by at least one of a roughening, knurling or other surface treatment or a surface coating in the filling region.

4. The method for producing a ball screw according to claim 1, wherein the spindle nut includes a peripheral groove on an outside thereof axially spaced from the stop region, and the method further comprises connecting said retaining element by the at least one of caulking, crimping, clinching, or deforming the material of the retaining element into the peripheral groove.

* * * * *